(12) United States Patent
Jestel et al.

(10) Patent No.: US 7,945,157 B2
(45) Date of Patent: May 17, 2011

(54) SHIP WITH A DATA NETWORK (75) Inventors: Dieter Jestel, Bad Oldesloe (DE); Jens Prüfer, Köln (DE)

(73) Assignee: Siemens Aktiengesellschaft, Munich (DE)

( * ) Notice: Subject to any disclaimer, the term of this patent is extended or adjusted under 35 U.S.C. 154(b) by 1036 days.

(21) Appl. No.: 11/661,199

(22) PCT Filed: Aug. 15, 2005

(86) PCT No.: PCT/EP2005/054008
§ 371 (c)(1),
(2), (4) Date: Feb. 26, 2007

(87) PCT Pub. No.: WO2006/021530
PCT Pub. Date: Mar. 2, 2006

(65) Prior Publication Data
US 2009/0269062 A1   Oct. 29, 2009

(30) Foreign Application Priority Data
Aug. 27, 2004   (DE) .......................... 10 2004 041 820

(51) Int. Cl.
*G02F 1/00* (2006.01)
(52) U.S. Cl. ....... 398/3; 398/4; 398/5; 398/59; 370/224; 370/242; 370/228
(58) Field of Classification Search .................. 398/3, 5, 398/7, 8, 58, 59, 60, 66, 67, 68, 70, 71, 72, 398/79, 83, 45, 1, 2, 4, 46, 47, 48, 49, 50, 398/55, 56, 57, 82, 10, 17, 13, 11, 19, 20, 398/33; 370/221, 222, 223, 224, 225, 227, 370/228, 242, 248, 401, 395.42, 403, 216, 217, 218
See application file for complete search history.

(56) References Cited

U.S. PATENT DOCUMENTS
5,040,168 A * 8/1991 Maue et al. ..................... 398/43
(Continued)

FOREIGN PATENT DOCUMENTS
EP   559314 A2   1/1993
(Continued)

OTHER PUBLICATIONS
Shah M Yip Extreme Networks S: "Extreme Networks' Ethernet Automatic Protection Switching (EAPS) Version 1" IETF Standard, Internet Engineering Task Force; IETF; CH; Oct. 2003, XP015009401 ISSN: 0000-0003.

*Primary Examiner* — Hanh Phan
(74) *Attorney, Agent, or Firm* — Harness, Dickey & Pierce, P.L.C.

(57) ABSTRACT

A ship includes a network, integrating services for security and control services and/or for multimedia and infotainment services on board the ship. The service-integrating network includes services for security-related systems as well as services for non-security-related systems. The conventional situation for network solutions on board cruise ships is characterized by a number of service functions and individual networks distributed over the entire ship. In at least one embodiment, the service-integrating network is embodied as a redundant ring both for services for security-relevant systems as well as for services for non-security-related systems. As such, the number of security functions and service functions and the number of individual networks can be advantageously reduced to a common high-security network.

28 Claims, 3 Drawing Sheets

U.S. PATENT DOCUMENTS

| | | |
|---|---|---|
| 6,351,582 B1 * | 2/2002 | Dyke et al. ............ 385/24 |
| 6,414,768 B1 * | 7/2002 | Sakata et al. ............ 398/59 |
| 7,099,755 B2 * | 8/2006 | Mueller et al. ............ 701/21 |
| 2002/0159402 A1 | 10/2002 | Binder |
| 2003/0043799 A1 | 3/2003 | Reinold et al. |
| 2003/0206548 A1 | 11/2003 | Bannai et al. |

FOREIGN PATENT DOCUMENTS

| | | |
|---|---|---|
| EP | 1320223 A2 | 6/2003 |
| JP | 63-67846 A | 3/1988 |
| WO | WO 03/073705 A1 | 9/2003 |
| WO | WO 2004/026685 A2 | 9/2003 |

* cited by examiner

SHIP WITH A DATA NETWORK

PRIORITY STATEMENT

This application is the national phase under 35 U.S.C. §371 of PCT International Application No. PCT/EP2005/054008 which has an International filing date of Aug. 15, 2005, which designated the United States of America and which claims priority on German Patent Application number 10 2004 041 820.9 filed Aug. 27, 2004, the entire contents of which are hereby incorporated herein by reference.

FIELD

Embodiments of the invention generally relate to a ship having an integrated services network. In particular, they may relate to an integrated service network, for security, safety and monitoring services and/or for multimedia and infotainment services on a ship, with the integrated services network having both services for security- and safety-relevant systems and services for non-security- and non-safety-relevant systems.

BACKGROUND

The passengers and crew in cruise liners have high expectations with regard to communication, information and entertainment. This includes Intranet/Internet access, an e-mail system, web-based information systems, games, and the availability of an extensive range of video and audio applications at all times.

The present situation for network solutions on board a cruise liner is described by a large number of service functions and individual networks which are distributed throughout the entire ship. At the moment, virtually every service has its own independent network. This means separate wiring for each service, and therefore major effort for installation work. In addition, each server has its own network components, thus making it highly complex and expensive to maintain these networks.

SUMMARY

At least one embodiment of the invention includes integrating in a network, the large number of service functions and individual networks which are distributed throughout the entire ship, and at the same time also of combining them with security- and safety-relevant services while at the same time satisfying the high-availability requirements associated with them, with the aim of doing this taking into account cost savings and the high-performance requirements of modern data networks.

According to at least one embodiment of the invention, an integrated services network is designed as a redundant ring both for services for security- and safety-relevant systems and for services for non-security- and non-safety-relevant systems. This makes it possible to reduce the multiplicity of security- and safety functions and service functions, which also includes the convenience functions, both of which are referred to in the following as services, and the multiplicity of individual networks involved with them, to one common high-security network, in an advantageous manner. A standard infrastructure ensures reduced wiring complexity, reduced procurement and operating costs, simpler maintenance and in particular additionally improved availability of the transmitted information at virtually any point in the ship.

For the purposes of at least one embodiment of the invention, only "redundant" means any design which maintains communication in the event of failure of a part of the network, for example the capability for bidirectional data traffic on the ring and/or a plurality of parallel rings or ring elements. Alternatively, in other words, duplicated presence of the same components in order to improve the reliability of the overall system is referred to as "redundancy".

It is expedient for the services for security- and safety-relevant systems to include one or more of the following services:
- a service for the monitoring and control installations, in particular including a service for an emergency disconnection system and/or in particular a service for controlling watertight doors,
- a service for a security- and safety management system and optionally for its subsystems,
- a service for a loudspeaker system, for example for a public announcement system.

The efficiency of a ship management system can be considerably improved by the data being available in a standard form for the various services.

A further improvement, in at least one embodiment, in the efficiency of data processing and data evaluation for a ship management system or improvement in the convenience and service functions is achieved in that the services for non-security- and non-safety-relevant systems comprise one or more of the following services, preferably both a personal service and a convenience service:
- a service for infotainment, in particular comprising information and entertainment, preferably including TV/radio,
- a telephone service,
- a service for an image monitoring system,
- a service for a sales system,
- a service for a PC network,
- a service for air-conditioning controllers,
- a service for lighting,
- a service for door monitoring.

On passenger ships, this therefore advantageously allows in some cases completely new services and convenience functions to be used and/or to be provided more easily both for passengers and for the crew.

In a further example refinement, the integrated services network has additional services for particularly critical systems, in particular a fire alarm system (F1), in particular services for alarm systems and/or services for ship automation. For example, these then include the services for controlling a rudder installation, for ship propulsion and/or for the ship power supply, as a component of the integrated services network. Thus, for example, the introduction of a voyage data recorder for the ship, which always represents a difficult task for the engineers, is thus considerably simplified. The information can be made available between the services and/or the data for the services for the most widely different systems can be made available centrally to the voyage data recorder via the common network.

One example embodiment of the invention resides in that a cabin interface multiplexer which is connected to the ring is provided for data distribution and/or data linking, for example for provision of convenience and personal services in a passenger cabin. The cabin interface multiplexers offer a cost-optimized interface between the integrated services network and the terminals to be connected.

Terminals for at least two different services can preferably be connected to the cabin interface multiplexer. The services for the standard terminals such as heating and air-conditioning controllers or the connection of a telephone for a telephone service are provided by the cabin interface controller.

It is expedient for one of the services to be an infotainment service, for example a radio and TV service, in particular a multimedia and infotainment service. Passengers can use an integrated network solution and the access to the integrated services network that is provided via the cabin interface multiplexer to enjoy a completely new class of services, such as Internet access, on-board e-mail system, video-on-demand and multimedia entertainment, in their cabins.

It is advantageous to arrange the cabin interface multiplexer in the area of the partition wall between two cabins. For example, this allows this arrangement to be used to supply two cabins via one and only one cabin interface multiplexer, for example with six ports, for example with the services for a respective telephone terminal, for a respective heating and air-conditioning controller, and for a respective TV/radio terminal. The use of one cabin interface multiplexer to supply two passenger cabins saves separate wiring for each cabin and thus reduces the costs for installation work and material.

A further cost saving is achieved by designing the cabin interface multiplexer to supply a plurality of cabins arranged physically close to one another.

The cabin interface multiplexer is preferably designed such that it has the function of a switch, that is to say for example the function of being automatically able to decide the port to which a message or data packet that has just arrived will be passed on. If two terminals transmit at the same time, there is no data collision, since the cabin interface multiplexer can internally transmit both messages virtually simultaneously.

The cabin interface multiplexer is advantageously designed to convert analog telephone data to voice-over-IP data. This makes it possible, for example, to connect low-cost telephone terminals in a very simple manner via the cabin interface multiplexer to the integrated services network. Telephone installations which are included in the integrated services network make it possible for the passenger to be offered all the service features of a modern telephone installation via the telephone terminal.

The integrated services network is preferably subdivided into virtual LAN groups, with the data traffic of at least one service, and preferably one and only one service, being associated with the virtual LAN groups. The physical network is subdivided into independent logic networks by the subdivision of the network into VLAN groups (virtual LAN). This leads to separation of the data traffic and prevents, for example, sensitive or operationally important data from entering the passenger area at all.

Another example embodiment of the invention is for each high-deck to have at least one interface multiplexer which is connected to the ring. Starting from an input port, the interface multiplexer provides the connection to the ring, for example 48 new Ethernet interfaces, to which in turn any desired terminals are connected, for example cabin interface multiplexers or a sales system. For example, the data lines for an automation system could also be connected to an interface multiplexer on any desired high-deck. This distribution provides access to the integrated services network at virtually any location in the ship. Furthermore, it is possible to react quickly and without major effort to a topology change in the terminal distribution.

At least one interface multiplexer is advantageously connected in a series circuit, starting from a switch for a first network segment, to the switch for a second network segment, in particular as a redundant interface ring with duplicated line routing. This cascading of the interface multiplexers with duplicated line routing has too major advantages over a star topology, on the one hand making it possible to save cable and installation costs, while on the other hand improving the data security and reliability.

In a more full-reaching refinement, an interface multiplexer is designed such that it has an integrated power supply when used for a terminal with a low power consumption, for example a telephone. The terminals with a restricted power consumption are then ready for use just by connection to the integrated services network. There is no need for a separate power supply. A power-over-LAN system links the low power consumption terminal to the power via the Ethernet cable. This also considerably reduces the installation costs, while achieving additional security and safety.

It is expedient for the integrated services network to transport the data for the services for security- and safety-relevant systems and, optionally, the data for the services for particularly critical systems with highest priority. Prioritization of the data and bandwidth management, the so-called QoS or "Quality of Service" features which, for example, are supported in particular by the IPv6 protocol, also ensure that the control and sensor data, whose volume is admittedly small but which is extremely important, is transported through the system with virtually no delay. The additionally redundant design of the network ensures the operational reliability, security and safety at all times.

In a further expedient refinement, the integrated services network is designed at least for two services, in particular for the services for the security- and safety-relevant systems and optionally for the services for the particularly critical systems, with standard interfaces and/or a standard protocol. Standard interfaces and protocols allow modular, system-open configuration, while the use of standard components makes it possible to create a customer-specific network system which complies with the specific requirements for each ship. The integrated services network can quickly and easily be matched to changing requirements at any time, without requiring any additional wiring for this purpose.

The integrated services network advantageously has at least two autonomous network segments which are physically separated from one another and are connected to one another via the ring. Each of the network segments preferably has an autonomous power supply or emergency power supply, in order to allow it to supply itself if necessary.

In a further advantageous refinement, each of the fire zones in a ship with a plurality of fire zones has a network area.

It is expedient for each network area to have a server and a telephone installation and to be arranged in a safety zone whose safety requirements are more stringent to meet safety level of the other fire zones in the ship.

Another example embodiment is for the integrated services network to be designed on the basis of Ethernet technology, in particular on the basis of Ethernet automatic protection switching (EAPS) technology. The EAPS technology, in particular the EAPS protocol, is a redundant protocol based on "layer two" of the "seven-layer model" and is optimized for rapid switching in the event of a fault. This is ideal for large networks in which star wiring systems would simply require too many cables.

It is also expedient for the integrated services network to use one or more of the following protocols, TCP/IP protocol,
UDP/IP protocol,
RTP/IP protocol,
RSVP protocol,
SMTP protocol,
NTP protocol,
SIP protocol, H.323 protocol,
DHCP protocol,
IGMP protocol,
EAPS protocol.

It is also expedient for the ring to have an optical waveguide. A ring based on optical waveguide technology has, in addition to the advantages of DC isolation and immunity to EMC interference, the major advantage of the weight saving. Optical waveguides can be used not only for the connections for the ring, that is to say for the actual backbone, but also for the other connections, for example from a switch to an interface multiplexer on high-deck, or for the optional interface rings.

BRIEF DESCRIPTION OF THE DRAWINGS

Example embodiments of the invention, although these have no restrictive effect, will now be explained in more detail on the basis of the drawing. For illustrative purposes, the drawing is not to scale, and certain features are illustrated only schematically. In detail.

DETAILED DESCRIPTION OF THE EXAMPLE EMBODIMENTS

Figure 1:
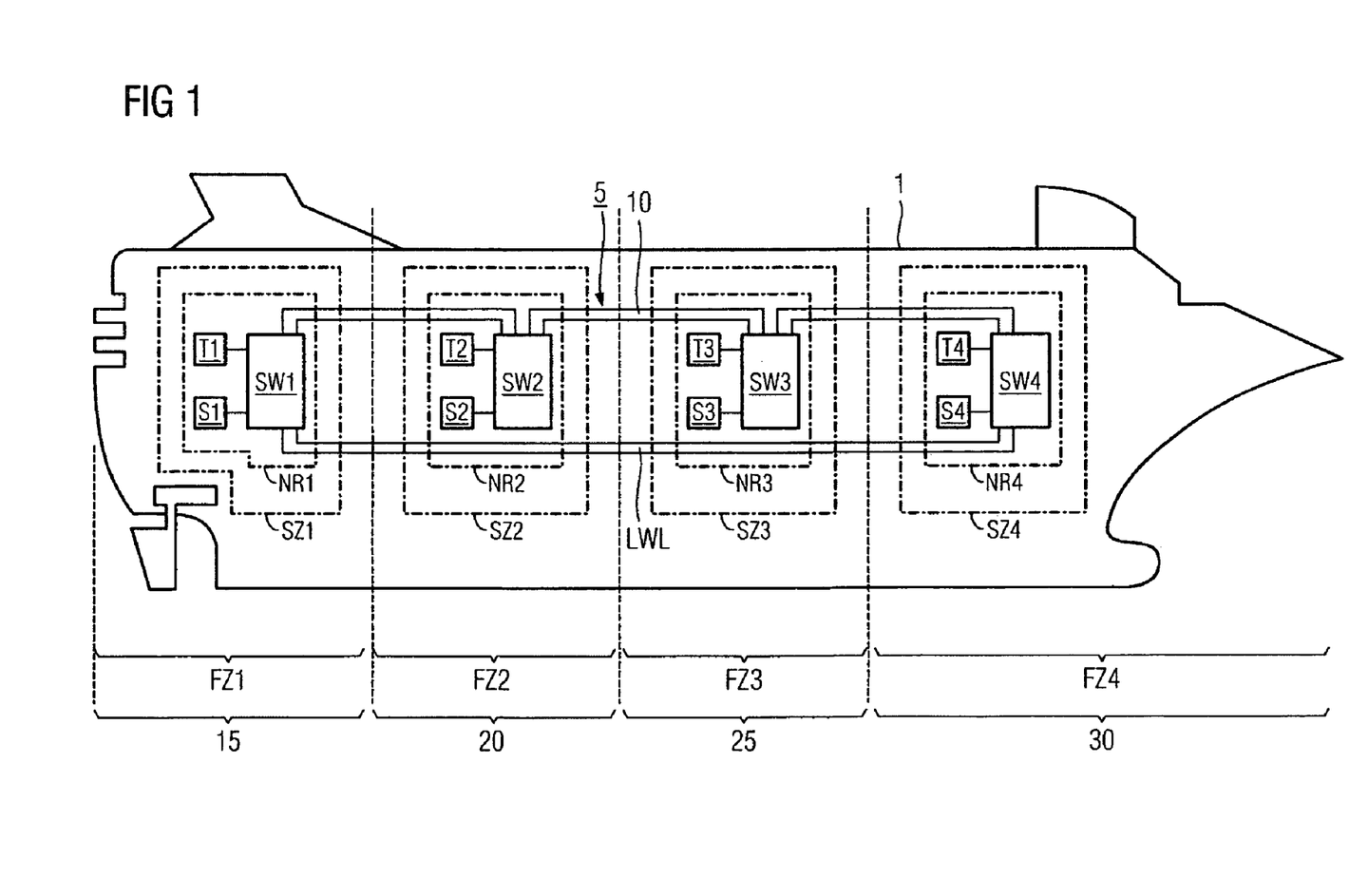
FIG. 1 shows the basic design of an integrated services network having a redundant ring distributed over a ship.

FIG. 1 shows an integrated services network 5 distributed over a ship 1. The integrated services network 5 is in the form of a redundant logic ring 10 based on EAPS technology. The EAPS protocol used here is a redundant protocol based on "layer 2", and is optimized for rapid switching in the event of a fault. It offers considerable cost advantages for large networks in ships, in which star wiring would lead to too many cables. The ring 10 is routed from the stern of the ship 1 to the port side by a first switch SW1 in the fire zone FZ1, to a second switch SW2 in the fire zone FZ2, and from here to a third switch SW3 in the fire zone FZ3, and from the third switch SW3 to a fourth switch SW4 in the fire zone FZ4, to the bow. A cable is routed from the bow on the starboard side from the fourth switch SW4 back again to the stern, and thus to the first switch SW1.

The ring 10 is connected to the intelligent and high-performance switches SW1 to SW4, and thus represents the backbone of the integrated services network 5. The ring 10 is in the form of an optical waveguide LWL. The line routing of the ring 10 is duplicated, with the two optical waveguides being routed on different paths. Duplicated line routing will be explained using the example of the direct link between the first switch SW1 and the second switch SW2: if the duplicated direct link between the first switch SW1 and the second switch SW2 is considered, then the first optical waveguide is routed on the high-deckhead, and the second optical waveguide is routed on a high-deck located underneath this, from the second switch SW2 back to the first switch SW1. FIG. 1 shows the line routing only in a highly schematic form.

Each switch SW1 to SW4 is accommodated in a network area NR1 to NR4. The network areas NR1 to NR4 are in turn located in safety zones SZ1 to SZ4. The safety requirements for the safety zones SZ1 to SZ4 are more stringent than the safety requirements of conventional fire zones FZ1 to FZ4. The reliability is particularly high, as a result of the switches SW1 to SW4 being arranged in the safety zones. The backbone of the integrated services network 5 is subdivided analogously to the fire zones FZ1 to FZ4 of the ship 1 into four network segments 15, 20, 25 and 30.

The network segments 15, 20, 25, 30 can operate completely autonomously, that is to say even if one fire zone is burnt out completely, the other three network segments can continue to carry out their tasks independently of the destroyed network segment. The autonomous operation of a network segment is achieved by each network area NR1 to NR4 in each case having its own autonomous telephone installation T1 to T4 and its own server S1 to S4, in addition to the intelligence and high-performance switches SW1 to SW4. In addition, a network power supply, that is to say an uninterruptible power supply, is required for autonomous operation (not shown here).

Figure 2:
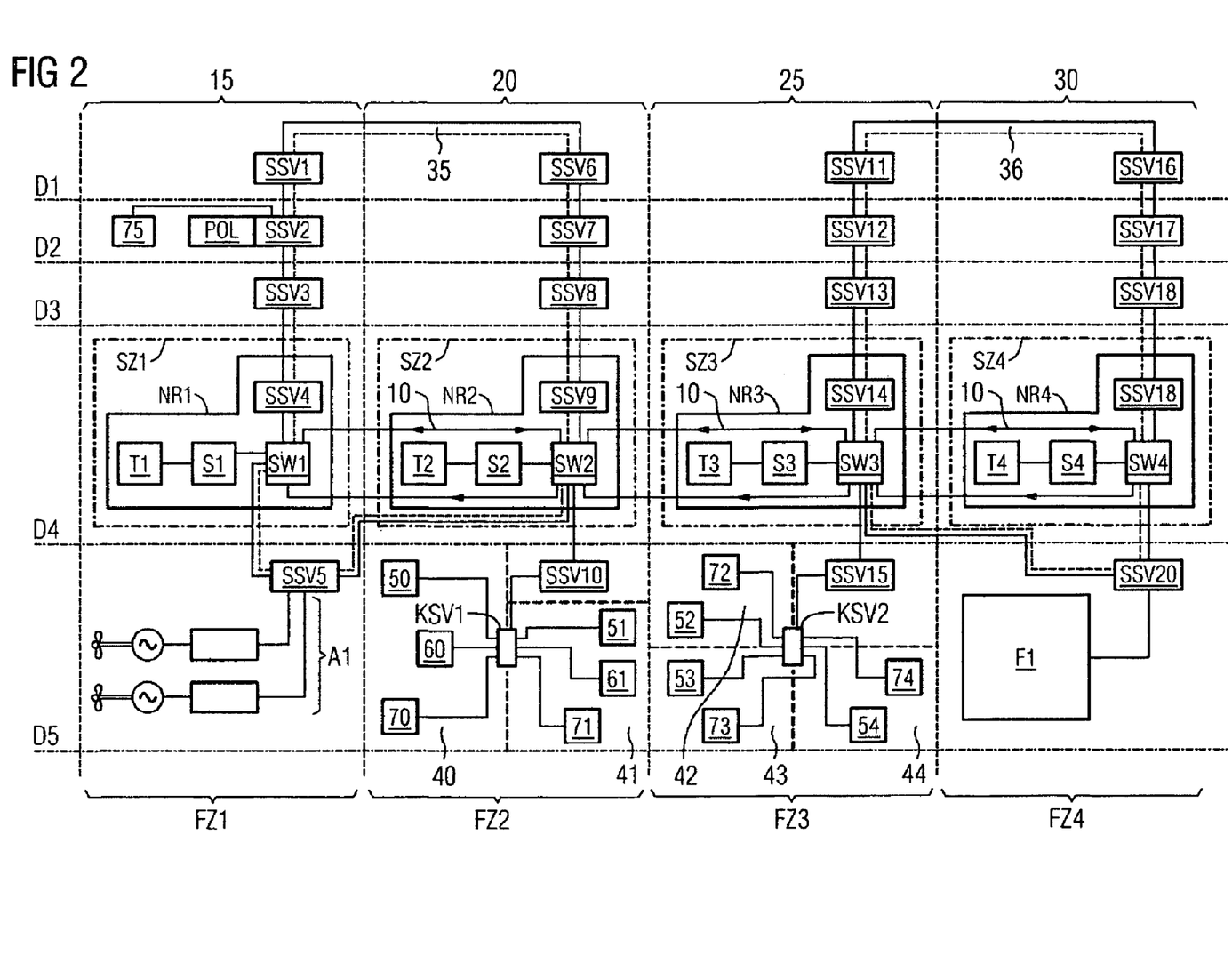
FIG. 2 shows the integrated services network from FIG. 1, in detail.

FIG. 2 shows, in detail, the integrated services network 5 from FIG. 1 with data distribution by way of interface multiplexers SSV1 to SSV20. In order to make the data available for widely differing terminals throughout the entire ship 1, interface multiplexers SSV1 to SSV20 are arranged on each high-deck D1 to D5 and in each fire zone FZ1 to FZ4. Starting from the switch SW1 in the network area NR1, which is in turn located in the safety zone SZ1 of the fire zone FZ1, the interface multiplexers SSV1 to SSV10 are connected to the switches SW1 and SW2. Each high-deck D1 to D5 has at least one interface multiplexer SSV1, . . . , SSV20 in each fire zone FZ1 to FZ4, for distribution of the data and for direct connection of terminals.

In order to improve data security and to save additional wiring, the interface multiplexers SSV1 to SSV4 are arranged in the fire zone FZ1, and the interface multiplexers SSV6 to SSV9 are arranged in the fire zone FZ2, and in the network segments 15, 20, from high-deck 4 to high-deck 1, as the first redundant interface ring 35. There is therefore a redundant connection between the interface multiplexers SSV1 to SSV4 and SSV6 to SSV9, in addition to the redundant ring 10, between the switch SW1 and the switch SW2. It is thus possible to continue to pass data via the interface ring 35 even in the event of a total failure of the redundant backbone connection between the switch SW1 and the switch SW2.

In order to connect low power consumption terminals, the interface multiplexer SSV1 has a power-over-LAN system as an integrated power supply POL, which supplies the terminals with electrical power via the Ethernet cable. This considerably reduces the installation costs, while achieving additional reliability. The integrated power supply POL feeds electrical power for the Ethernet ports into the Ethernet cable. Specific conductors in the Ethernet cable are used for this purpose.

The integrated power supply POL can also be connected directly to an uninterruptible power supply, which is not illustrated, in order to permanently provide a supply voltage at the Ethernet ports. An intelligent protection mechanism automatically identifies power-over-LAN-compatible appliances, and applies the voltage to the Ethernet only after they have been identified. This therefore also provides effective protection for those terminals which are not compatible with the power-over-LAN technique. One illustrated telephone 75 is a terminal with low power consumption and receives its operating voltage via the power supply POL which is integrated in the interface multiplexer SSV2.

The connection between the switch SW3 and the switch SW4 is supplemented by a redundant second interface ring 36, analogously to the interface ring 35 between the switch SW1 and the switch SW2. Alternatively, the interface multiplexers can also be connected to the switches SW1 to SW4 in a star circuit. Starting from the switch SW2, one interface multiplexer SSV10 is connected directly to it. The interface multiplexer SSV10 is located in fire zone FZ2 on high-deck 5. A cabin interface multiplexer KSV1 is connected to it, as a further terminal. The cabin interface multiplexer KSV1 once again provides the capability to provide further multiplexing using the Ethernet port provided via the interface multiplexer SSV10. The interface multiplexer SSV10 provides 40 Ethernet ports. The cabin interface multiplexer KSV1 is connected to one of these Ethernet ports.

The cabin interface multiplexer KSV1 can in turn provide six Ethernet ports or connections for terminals. These six terminal connections at the same time supply two passenger cabins 40, 41, each with three terminal interfaces. The passenger cabin 40 receives three terminal connections from the cabin interface multiplexer KSV1. A first radio/TV 50 is thus connected via the cabin interface multiplexer KSV1 and via the interface multiplexer SSV10 to the switch SW2. All of the services required for the passengers are provided, down to cabin level, by this link to the integrated services network 5.

Furthermore, a first air-conditioning controller 60 is connected to the cabin interface multiplexer KSV1. The passenger in the cabin 40 can set the room temperature at his or her preferred comfort environment via this air-conditioning controller 60. A third terminal from the cabin 40 is likewise connected to the cabin interface multiplexer KSV1. The third terminal is a telephone 70, and is thus connected via the cabin interface multiplexer KSV1 and the interface multiplexer SSV10 to the switch SW2, and through it to the telephone installation T2. All of the services for one of the telephone installations T1 to T4 can therefore be provided down to cabin level.

A cabin interface multiplexer KSV1, KSV2 is not intended exclusively for use in passenger cabins. For example, it can also provide the services for an EPOS cassette system, for a passenger information system, for a telephone, for passenger PCs, for a television, for video-on-demand and/or for video monitoring CC-TV in areas other than the passenger cabins. For example, a cabin interface multiplexer KSV1, KSV2 can also offer the available services in a conference room or in a lounge.

As an alternative to the use of one cabin interface multiplexer KSV1 to supply two passenger cabins 40, 41, a further cabin interface multiplexer KSV2 can be arranged between a plurality of cabins 42, 43, 44 in such a manner that it can supply two services to each cabin. The cabin interface multiplexer KSV2 is connected via the interface multiplexer SSV15 to the switch SW3, and is thus connected to the integrated services network 5. The cabin interface multiplexer KSV2 supplies the third passenger cabin 42, with a radio/TV 52 and a telephone 72. Furthermore, the fourth passenger cabin 43 and the fifth passenger cabin 44 are supplied, which each have one radio/TV 53, 54 and one telephone 73, 74.

In addition to the services for non-security- and non-safety-relevant systems, which are provided as a priority for passenger convenience, services for security- and safety-relevant systems can also be passed via the integrated services network 5. One system which is safety-relevant and is also critical, a fire alarm installation F1, is connected via the interface multiplexer SSV20 to the switch SW4 and to the switch SW3, in each case via a duplicated link. In a similar manner to the interface rings 35, 36, the redundant network link from the interface multiplexer SSV20 to the switch SW4 via the switch SW3 and back to the interface multiplexer SSV20 forms a ring element. Since the integrated services network 5 also provides services for critical systems, the fire alarm installation F1 can thus pass its warning or evacuation signals to any terminal in the ship.

In addition to services for non-security- and non-safety-relevant systems and for security- and safety-relevant systems, the integrated services network 5 also has services for particularly critical systems. In this case, one particularly critical system is an automation system A1 for propulsion of the ship 1.

The automation system A1 is connected via the interface multiplexer SSV5 by a redundant ring element to the switch SW1 and to the switch SW2. The control and propulsion data for the particularly critical automation system A1 can thus be carried by a service for particularly critical systems via the integrated services network 5 with the highest priority to a control panel, which is not illustrated, and/or to the ship bridge.

Figure 3:
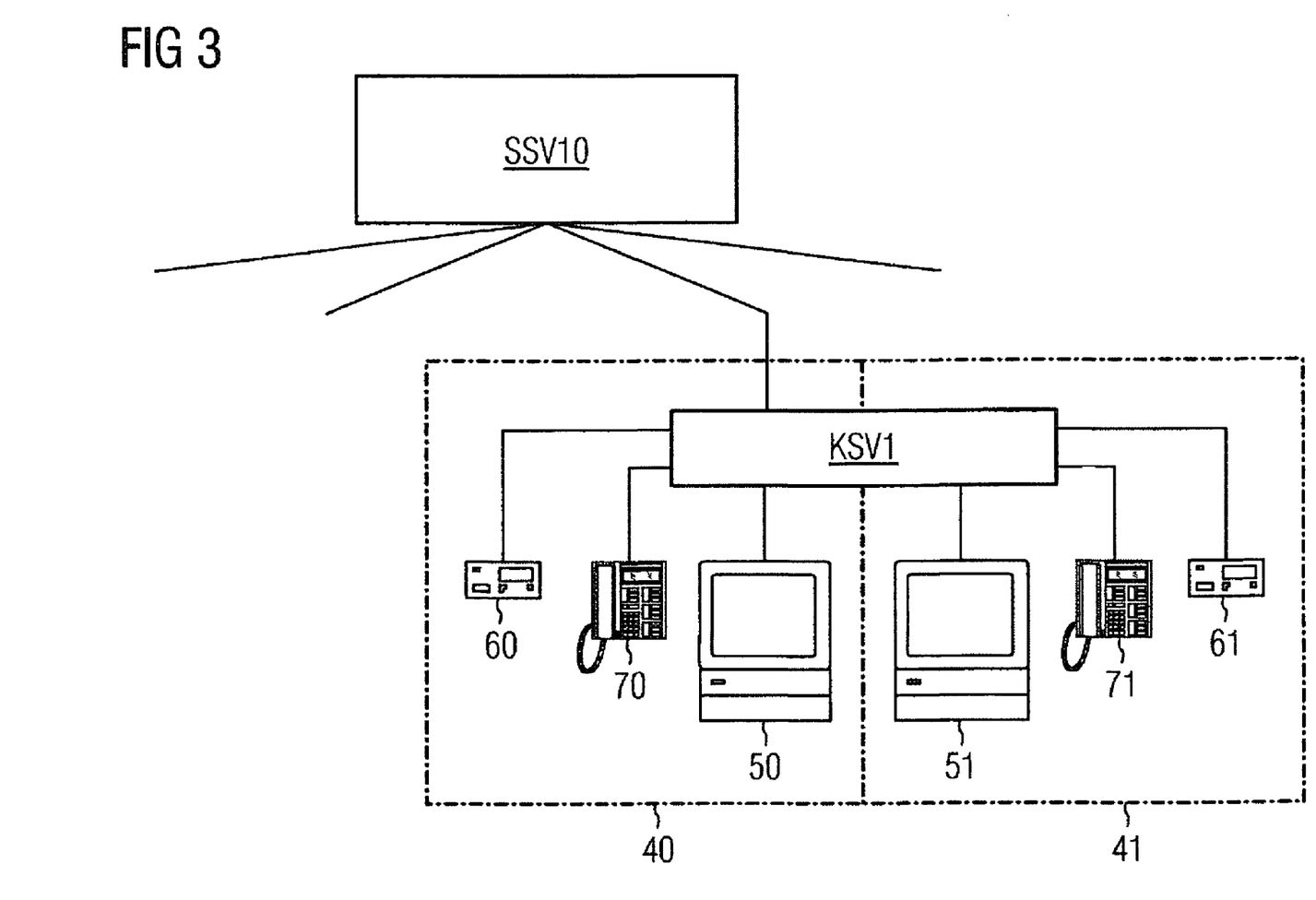
FIG. 3 shows a cabin interface multiplexer for two cabins in the ship, each having three terminals.

As a detail from FIG. 2, FIG. 3 shows the passenger cabins 40 and 41 in detail. The adjacent passenger cabins 40, 41 have a cabin interface multiplexer KSV1 on their partition wall. Since one cabin interface multiplexer can supply two passenger cabins with services and terminals without any loss of performance and convenience features, this reduces the cable laying and cable installation complexity. The spur line which is passed from the interface multiplexer SSV10 to the cabin interface multiplexer KSV1 is thus of simple design.

The cabin interface multiplexer KSV1 can provide six Ethernet interface ports from one Ethernet interface port on the basis of the functionality implemented in it. For a standard cabin 40, 41, it is sufficient to provide three major systems or services. These three services may include an infotainment service which supplies a radio/TV 50 an air-conditioning installation service which connects an air-conditioning controller 60 to its controller, and a telephone service which provides a telephone 70 in the passenger cabin 40. The services provided in the cabin 40 are the same as those in the passenger cabin 41.

In addition, this results in the following example refinements:

1. Communication

The use of wire-free communication and the joint transmission of information and power via a bus make it possible to transfer the saving potentials of field-bus technology, which are primarily in the wiring, to the power side. There is therefore no need for any switchgear cabinets. In addition, no additional bus is any longer required for security or safety purposes.

One very major criterion in the ship design is internal and external communication security. This governs whether Internet is accepted in automation. Particular advantages in this case are the addition of a real-time capability to standard Ethernet communication. In this case, Profinet can be used as the basic technology, combining the advantages of field-bus and Internet technology. In particular, the use of so-called isochrones real-time Ethernet on a bus allows precision synchronization of more than 100 drive shafts with a discrepancy of less than one microsecond, without adversely affecting the standard Ethernet functions.

2. Service integration 2.1 Integrated Network Solutions

Passengers in cruise liners have high expectations in terms of communication, information and entertainment. This includes Intranet/Internet access, an e-mail system, web-based information systems, games and the availability of an extensive range of video/audio applications at all times.

2.1.1 Integrated Network Solution for Ship Passengers

An integrated network solution allows passengers to enjoy a completely new range of services, such as Internet access, an on-board e-mail system, video-on-demand and multimedia entertainment.

An integrated network solution can be used to supply passengers with personalized information, more quickly, about activities on the ship.

Passengers have the capability to connect to their own Notebooks via wireless LAN (WLAN) or via TCP/IP connections which are accessible in cabins and public areas throughout the ship.

Passengers can, of course, use internal and external telephone communication via landline and mobile telephones.

2.1.2 Integrated Network Solution for Ship Crews

For ship operators, it is frequently difficult to find good personnel. It is therefore evermore important to make the on-board facilities for personnel and for the crew of the ship as attractive as possible. The crew can therefore also all enjoy the advantageous passenger services.

However, work is also made easier. An integrated ship management system integrates all of the security, safety and control systems. This also includes devices for security and safety management, for assistance to decisions, for preventative maintenance, and for intelligent data storage and processing. The crew always has access to critical operating information, and is provided with notes and tips, if necessary. This improves the security and safety of the entire ship. The information is in this case available throughout the entire ship area. Notebooks or small handheld computer devices can be connected via wireless LAN (WLAN) or via TCP/IP connections.

2.1.3 Integrated Network Solutions for Ship Operators

The use of high-speed SatCom satellite links allows all of the ship information to be sent to a ship operator on land.

In particular, the amounts of data to be transferred to the land in order to monitor the ship can also be transferred via the satellite link.

The operator can access this information throughout the world by means of an additional virtual private network (VPN).

2.1.4 Network Infrastructure

Nowadays, a multiplicity of service functions is distributed throughout the entire ship on a cruise liner. Only a very small number of these functions are linked to one another, or use the latest fiber-optics technology. At the moment, every service has its own independent network. This means separate wiring for each service, therefore involving a large amount of installation work. In addition, each service has its own network components, which makes it highly complex and expensive to maintain these networks.

At least one embodiment of the invention results in at least one of the following further advantages:

a) Safe operation of the ship and overall reduction of system costs.

The use of fiber-optics technology guarantees the highest level of security, safety and reliability, because fiber optics are not sensitive to electromagnetic interference. Cable damage, for example caused by fire, will not influence the rest of the network.

The best solution is to use a common integrated services network in order to coordinate all of the services and components in the ship. The integrated services network may include subsystems such as security cameras, ship management, announcement system loudspeakers, a telephone facility and passenger PCs.

The integrated services network can, specifically, be matched to any operator and shipyard. Depending on the requirement, the concepts for this purpose can be developed further in order to reduce system costs, to optimize operation on board the ship and on land, and to enhance the ship and environmental safety and security, and to satisfy the requirements of the classification organizations.

For example, the integration of all of the security, safety and monitoring systems allows the ship crew to have access to critical operating information at any time. This improves the security and safety of the entire ship to a major extent.

The integrated network solution offers both redundancy for stand-alone networks and high availability by virtue of the speed and cost-efficiency of a single integrated system.

Integrated networks with fiber-optic backbones not only help to reduce heavy copper cables but also to reduce the total number of cables and, in particular in this case, to reduce the heavy cable weights in the high-deck areas. One very important factor for shipyards is that integrated networks simplify planning and reduce installation costs.

b) Simplification of maintenance and management

Fault localization work in a multiplicity of networks and the obtaining of reliable network data form a complex and therefore expensive task. The use of a single network can simplify maintenance and fault-finding, and is therefore more cost-efficient.

The use of advanced active components allows continuous self-monitoring, and cable breaks and hardware faults can be isolated and identified quickly, anywhere in the entire system. Simple, precise problem localization allows faulty parts, such as electronics boards, to be replaced immediately, without the service being interrupted.

c) Flexibility

Both bandwidth margins and optical fibers mean that subsequent extension to the network is particularly simple and easy. Starting with a small number of selected integrated services, a complete integrated network can be achieved by step-by-step migration. In this case, services can be added when they are required.

d) New capabilities

An integrated services network makes it possible to access essential information virtually anywhere on board the ship, and, of course, from land as well via satellite communication.

The integration of all of the services makes it possible to install a novel form of ship information services, by which passengers are provided with more information about the multiplicity of activities on board the ship, while the crew have access to important information about the ship, at all times and anywhere on board the ship.

An integrated network allows Internet access and a completely new class of services, such as video-on-demand, multimedia games and the provision of new sources of information.

e) Futureproof investment and solutions

The modular, open-system configuration and the use of standard components allow the creation of a customer-specific network system which can meet the specific requirements of any ship.

For investment protection, the system can be matched to changing requirements at any time—quickly and easily. No additional wiring is required for this purpose.

The integrated services network is based on standard components and can be configured on a custom-specific basis in order to meet the requirements of any ship. The flexibility resulting from the use of standard components allows subsequent installation (migration) of the integrated services network.

EPOS system (electronic point of sale) or else cassette systems, ship management system, ship information system, telephone system (voice-over IP), passenger PC system, IP-based CCTV system (video monitoring) and digital TV system with video/audio-on-demand.

The integrated services network guarantees security, safety and reliability on board, preferably by way of:
- a high degree of redundancy in hardware and cable requirements,
- different virtual local area networks (VLANs) for different services,
- physical layer access control via smart cards,
- additional high layer protection for critical data access and services
- a high degree of encryption for all critical data in the network,
- tailor made network management tools.

Further advantages of the integrated services network are:
a) Advantages for shipyards
   low investment costs because of reduced network wiring and reduced distribution boards, as well as space-saving solutions;
   latest technology for better competitiveness and investment protection.
b) Advantages for passengers
   Advanced communication facilities:
      TV, radio, video/audio-on-demand;
      PC functions
      Internet, e-mail;
      passenger information
      PC games
      cash register
c) Advantages for ship owners
   low investment costs as a result of reduced network wiring and reduced distribution boards, as well as space-saving solutions;
   low life-cycle costs
      1) simple upgrade or addition of additional services,
      2) bandwidth margins
      3) reduced and simplified maintenance and management
   new capabilities
   new sources for information can be created.
d) Advantages for the operator:
   simpler network management,
   permanent availability of all important information everywhere on board the ship,
   complete and reliable information on the basis of redundancy and continuous self-monitoring,
   new approaches to obtain and manage important technical and financial data,
   improved passenger information system,
   easy-to-use content management.

2.2 Integrated Ship Management System

Risk, security and safety management systems for the maritime and industrial market will be characterized by a very strong demand in the coming years because of new legal regulations.

The international committees and law-making institutes have therefore required the creation of binding, essential regulations, valid throughout the world, to ensure safety on ships. This has resulted in the ISM (International Safety Management System) code, to which, throughout the world, around 67 000 ships above 500 GRT (Gross Register Tons) and approximately 12 000 shipping companies have been subject.

Although ship design has been developed enormously, there have until now been no complete solutions, particularly in terms of technical equipment. Only insular solutions have been achieved for widely differing areas, but no standardization. In extreme situations and emergencies, a single person (captain) has had to simultaneously operate up to 21 computers with widely differing interfaces (DOS, Windows, XENIX, UNIX, etc.).

This problem can be solved by the combination of these individual areas—a technical safety management system into which all systems are fed.

With the introduction of the ISM code, all emergency situations (42 emergency plans and their combination) as well as task lists prepared in advance (marine kill cards) can be linked manually and automatically. Furthermore, the ISM code specifies an electronic decision support system, which collates accident-relevant data in order to allow the captain to make a relevant decision. In addition, maintenance monitoring and planning, the documentation of all measures and situations, hazardous goods codes, cargo stability and damage control data, security, safety and rescue facilities and a complete ship information system (including the display of all decks, cross sections and side views) are specified.

The current situation on board is that at least three safety management systems, and on some ships even up to eight safety management systems, which are compatible with one another, exist alongside one another.

This situation is improved by the combination of all of these systems to form a single system, that is to say an integrated ship management system.

The introduction of the VDA and AIS system makes it possible for any desired coastal states and authorities to completely monitor the ships. The introduction of the ISM codes, STCW 95, planned and controlled maintenance as well as ISO 9002 and, in the future, ISO 14001 on 60 000 ships and the documentation applications associated with this result in the necessity for documentation management systems (AVECS, QDMS) in order to make it possible to cope with the deluge of documents. Every technical process, security and safety measures, working processes and loading processes must be based on checklists and procedures. In addition to nautical aspects, all of the maintenance, security, safety and environmental processes as well as technical statuses (alarms) will be stored in the blackbox. Fault management systems (see AIDA from AVECS) must verify the action taken in the event of non-conformities and deficiencies.

In order to make it possible to cope with the ever greater number of passengers, passenger vessels and ferries must verify visualized evacuation plans with automatic risk indications in the safety management system. An automatic implementation of this system can be achieved by the inclusion of the booking system in the integrated ship management system. A crew management system (AVACs crew master) will be included for automatic security and safety roles and in order to comply with the obligations from the STCW law.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A ship comprising:
   an integrated services network including both services for at least one of security and safety-relevant systems and services for at least one of non-security and non-safety-relevant systems, the integrated services network being in the form of a redundant logic ring including an optical waveguide, a line routing of the ring being duplicated, with the two optical waveguides being routed on different paths, wherein one of the two optical waveguides is routed on a different deck of the ship than the other one of the two optical waveguides.

2. The ship as claimed in claim 1, wherein the services for security or safety-relevant systems comprise at least one of the following services:
   a service for the monitoring and control installations,
   a service for a security or safety management system and optionally for its subsystems, and
   a service for a loudspeaker system including a public announcement system.

3. The ship as claimed in claim 2, wherein the services for at least one of non-security and safety-relevant systems comprise at least one of the following services:
   a service for infotainment,
   a telephone service,
   a service for an image monitoring system,
   a service for a sales system,
   a service for a PC network,
   a service for air-conditioning controllers,
   a service for lighting, and
   a service for door monitoring.

4. The ship as claimed in claim 1, wherein the services for the at least one of non-security and the non-safety-relevant systems comprise at least one of the following services:
   a service for infotainment,
   a telephone service,
   a service for an image monitoring system,
   a service for a sales system,
   a service for a PC network,
   a service for air-conditioning controllers,
   a service for lighting, and
   a service for door monitoring.

5. The ship as claimed in claim 1, wherein the integrated services network further includes additional services for particularly critical systems.

6. The ship as claimed in claim 1, further comprising:
   a cabin interface multiplexer, connected to the ring, for at least one of data distribution and data linking.

7. The ship as claimed in claim 6, wherein terminals for at least two different services are connectable to the cabin interface multiplexer.

8. The ship as claimed in claim 7, wherein one of the services is an infotainment service.

9. The ship as claimed in claim 6, wherein the cabin interface multiplexer is arranged in an area of a partition wall between two cabins.

10. The ship as claimed in claim 6, wherein the cabin interface multiplexer is designed to supply a plurality of cabins arranged physically close to one another.

11. The ship as claimed in claim 6, wherein the cabin interface multiplexer includes the function of a switch.

12. The ship as claimed in claim 6, wherein the cabin interface multiplexer is designed to convert analog telephone data to voice-over-IP data.

13. The ship as claimed in claim 1, wherein the integrated services network is subdivided into virtual LAN (Local Area Network) groups, with the data traffic of at least one service, and preferably one and only one service, being associated with the virtual LAN groups.

14. The ship as claimed in claim 1, further comprising a plurality of decks, each deck including at least one interface multiplexer connected to the ring.

15. The ship as claimed in claim 14, wherein at least one of the at least one interface multiplexer is connected in a series circuit, starting from a switch for a first network segment to the switch for a second network segment.

16. The ship as claimed in claim 15, wherein at least one of the at least one interface multiplexer is included for a terminal with low power consumption and includes an integrated power supply.

17. The ship as claimed in claim 14, wherein at least one of the at least one interface multiplexer is included for a terminal with low power consumption and includes an integrated power supply.

18. The ship as claimed in claim 1, wherein the integrated services network transports the data for the services for security or safety-relevant systems and, optionally, data for the services for particularly critical systems with relatively highest priority.

19. The ship as claimed in claim 1, wherein the integrated services network is designed at least for two services.

20. The ship as claimed in claim 19, wherein the integrated services network is designed at least for the services for at least one of the security and safety-relevant systems.

21. The ship as claimed in claim 19, wherein for the services for particularly critical systems, the integrated services network is designed with at least one of standard interfaces and a standard protocol.

22. The ship as claimed in claim 1, wherein the integrated services network includes at least two autonomous network segments which are physically separate from one another and are connected to one another via the ring.

23. The ship as claimed in claim 1, further comprising a plurality of fire zones, wherein each of the fire zones includes a network area.

24. The ship as claimed in claim 23, wherein each network area includes a server and a telephone installation and is arranged in at least one of a security and a safety zone whose security or safety requirement goes beyond the security or safety level of the other fire zones in the ship.

25. The ship as claimed in claim 1, wherein the integrated services network is designed on the basis of Ethernet technology.

26. The ship as claimed in claim 1, wherein the integrated services network uses at least one of the following protocols:
   TCP/IP protocol,
   UDP/IP protocol,
   RTP/IP protocol,
   RSVP protocol,
   SMTP protocol,
   NTP protocol,
   SIP protocol,
   H.323 protocol,
   DHCP protocol,
   IGMP protocol,
   EAPS protocol.

27. The ship of claim 1, wherein the integrated services network is at least one of for security, safety and monitoring services and for multimedia and infotainment services on the ship.

28. The ship as claimed in claim 1, wherein the service for the monitoring and control installations includes at least one of a service for an emergency disconnection system and a service for controlling watertight doors.

* * * * *